US011027782B2

(12) United States Patent
Fujii et al.

(10) Patent No.: US 11,027,782 B2
(45) Date of Patent: Jun. 8, 2021

(54) VEHICLE FRONT-PART STRUCTURE

(71) Applicant: Toyota Jidosha Kabushiki Kaisha, Toyota (JP)

(72) Inventors: Yusuke Fujii, Toyota (JP); Yoshihito Tomizawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 9 days.

(21) Appl. No.: 16/458,577

(22) Filed: Jul. 1, 2019

(65) Prior Publication Data

US 2020/0010123 A1    Jan. 9, 2020

(30) Foreign Application Priority Data

Jul. 3, 2018  (JP) .............................. JP2018-127150
Jul. 13, 2018 (JP) .............................. JP2018-133042

(51) Int. Cl.
| | | |
|---|---|---|
| *B62D 25/20* | (2006.01) | |
| *B62D 21/02* | (2006.01) | |
| *B60K 1/04* | (2019.01) | |
| *B60L 50/64* | (2019.01) | |
| *B60L 50/60* | (2019.01) | |
| *B60L 53/22* | (2019.01) | |

(52) U.S. Cl.
CPC ............ *B62D 25/2018* (2013.01); *B60K 1/04* (2013.01); *B60L 50/64* (2019.02); *B60L 50/66* (2019.02); *B62D 21/02* (2013.01); *B60K 2001/0438* (2013.01); *B60L 53/22* (2019.02); *B60L 2210/10* (2013.01); *B60L 2210/30* (2013.01)

(58) Field of Classification Search
CPC ...... B62D 25/2018; B62D 21/02; B60K 1/04; B60K 2001/0438; B60L 50/64; B60L 50/66; B60L 53/22; H01M 2/1077; H01M 2/1083; H01M 2/1072
USPC ........................................................ 180/68.5
See application file for complete search history.

(56) References Cited

U.S. PATENT DOCUMENTS

| | | | | |
|---|---|---|---|---|
| 5,555,950 A * | 9/1996 | Harada | ................. | H01M 50/20 180/65.1 |
| 8,333,425 B2 * | 12/2012 | Yoshida | ............... | B62D 21/155 296/187.09 |
| 8,708,402 B2 * | 4/2014 | Saeki | .................... | B62D 21/157 296/187.12 |
| 9,776,661 B2 * | 10/2017 | Kaneko | .................. | B62D 21/11 |
| 2015/0217707 A1 | 8/2015 | Tanigaki et al. | | |
| 2019/0322164 A1 * | 10/2019 | Sasaki | ................. | B62D 21/155 |

FOREIGN PATENT DOCUMENTS

| | | |
|---|---|---|
| JP | H07117725 A | 5/1995 |
| JP | 2006224877 A | 8/2006 |
| JP | 2009083597 A | 4/2009 |
| WO | 2014034377 A1 | 3/2014 |

* cited by examiner

*Primary Examiner* — John D Walters
(74) *Attorney, Agent, or Firm* — Dinsmore & Shohl LLP

(57) ABSTRACT

A battery unit is positioned under the floor of a vehicle chamber. A battery-side extension is provided on the lower surface of the front part of the battery unit case. A member-side extension member is provided, on the rear part of a suspension member, at a position facing the battery-side extension in the vehicle front-and-rear direction.

5 Claims, 10 Drawing Sheets

VEHICLE FRONT-PART STRUCTURE

CROSS REFERENCE TO RELATED APPLICATION

This application claims priorities to Japanese Patent Application No. 2018-127150 filed on Jul. 3, 2018, and Japanese Patent Application No. 2018-133042 filed on Jul. 13, 2018, which are incorporated herein by reference in their entireties, including the specifications, claims, drawings, and abstracts.

TECHNICAL FIELD

The present disclosure relates to a vehicle front-part structure.

BACKGROUND

An electric car or the like which uses a rotating electric machine as a driving source is equipped with a battery unit. For example, in WO 2014/034377, a battery unit is mounted under the floor of the vehicle chamber (underfloor).

In a circuit, an electric power conversion unit, including a DC/DC converter for performing voltage step-up/step-down operation and an inverter for performing AC/DC conversion, is provided between the rotating electric machine and the battery unit. The rotating electric machine and the electric power conversion unit are mounted in an engine compartment.

In addition, front wheels are arranged on respective sides of the engine compartment, and a suspension member which is a skeleton member for suspending the front wheels is provided under the engine compartment. When the battery unit is mounted under the floor, the suspension member is positioned in front of the battery unit.

At the time of a vehicle frontal collision (hereinafter referred to as "frontal collision" if necessary), the suspension member is pushed by an obstacle and retreats. At this time, the suspension member collides with the battery unit, which may cause damage to the battery unit. Accordingly, an object of the present disclosure is to provide a vehicle front-part structure that can avoid a collision between the suspension member and the battery unit at the time of a frontal collision.

SUMMARY

The present disclosure relates to a vehicle front-part structure. The vehicle front-part structure includes a battery unit provided under the floor of a vehicle chamber and a suspension member provided in front of the battery unit. In the vehicle front-part structure, a floor-side extension member having a front end inclined surface is provided on the lower surface of the floor and in front of the battery unit, such that the lower side of the front end inclined surface is located on the rear side, a battery-side extension member having a front end inclined surface is provided on the front part of the battery unit which is on the lower rear side of the floor-side extension member, such that the lower side of the front end inclined surface is located on the rear side, and a member-side extension member having a rear end inclined surface is provided on the rear part of the suspension member, which is in front of the floor-side extension member, such that the lower side of the rear end inclined surface is located on the rear side.

According to the above structure, when the suspension member is retracted at the time of a frontal collision, the member-side extension member and the floor-side extension member collide with each other first. Then, when the suspension member is further retracted, the member-side extension member and the battery-side extension member collide with each other, and the rear surface of the suspension member can move downward to avoid a collision with the battery unit.

In addition, in the above disclosure, a lower end of the floor-side extension member may be located lower than an upper end of the battery-side extension member.

According to the above structure, after the floor-side extension member and the member-side extension member collide with each other, the suspension member penetrates downward and rearward (diagonally downward) along the inclination of the opposing surfaces of the extension members, and the floor-side extension member is lifted up. This causes the inclined surface of the member-side extension member and the inclined surface of the battery-side extension member to face and slide with respect to each other, thereby making it possible to prevent a collision between the suspension member and the battery unit.

Further, in the above disclosure, the opposing surfaces of the member-side extension members may be inclined to be more horizontal than the opposing surfaces of the floor-side extension members.

Due to the support structure of the suspension member, at the time of a frontal collision, the suspension member is sometimes retracted such that a rear end of the suspension member is inclined downward, that is, such that the opposing surfaces of the member-side extension members are directed downward. Accordingly, by laying the opposing surfaces of the member-side extension members to be more horizontal than the opposing surfaces of the floor-side extension members in advance, it becomes possible to make the opposing surfaces of the member-side extension members and the opposing surfaces of the floor-side extension members parallel with each other when the suspension member is retracted.

In addition, the vehicle front-part structure according to another aspect of the present disclosure includes a battery unit provided under the floor of a vehicle chamber and a suspension member provided in front of the battery unit and in front of the vehicle chamber. In the vehicle front-part structure, a battery-side extension member having a front end inclined surface is provided on the front part of the battery unit such that the lower side of the front end inclined surface is located on the rear side, and a member-side extension member having a rear end inclined surface is provided to protrude on the rear part of the suspension member which is in front of the battery-side extension member, such that the lower side of the rear end inclined surface is located on the rear side.

According to the above structure, when the suspension member moves rearward, the member-side extension member and the battery-side extension member collide with each other, and the suspension member penetrates downward and rearward (diagonally downward) along the inclination of the opposing surfaces of the extension members. It thus becomes possible to prevent a collision between the suspension member and the battery unit.

In addition, in the above disclosure, the battery unit includes a battery assembly and a case for containing the battery assembly. The battery-side extension member is provided on the lower surface of the front part of the case, and in the case, a portion around the battery-side extension member may be hollow.

According to the above structure, even if the member-side extension member and the battery-side extension member collide with each other, and the case is deformed, the impact can be absorbed without damages to components because, in the case, no components are included on the portion around the battery-side extension member.

According to the present disclosure, it becomes possible to avoid a collision between the suspension member and the battery unit at the time of a frontal collision.

BRIEF DESCRIPTION OF DRAWINGS

Embodiments of the present disclosure will be described by reference to the following figures, wherein.

DESCRIPTION OF EMBODIMENTS

Figure 1:
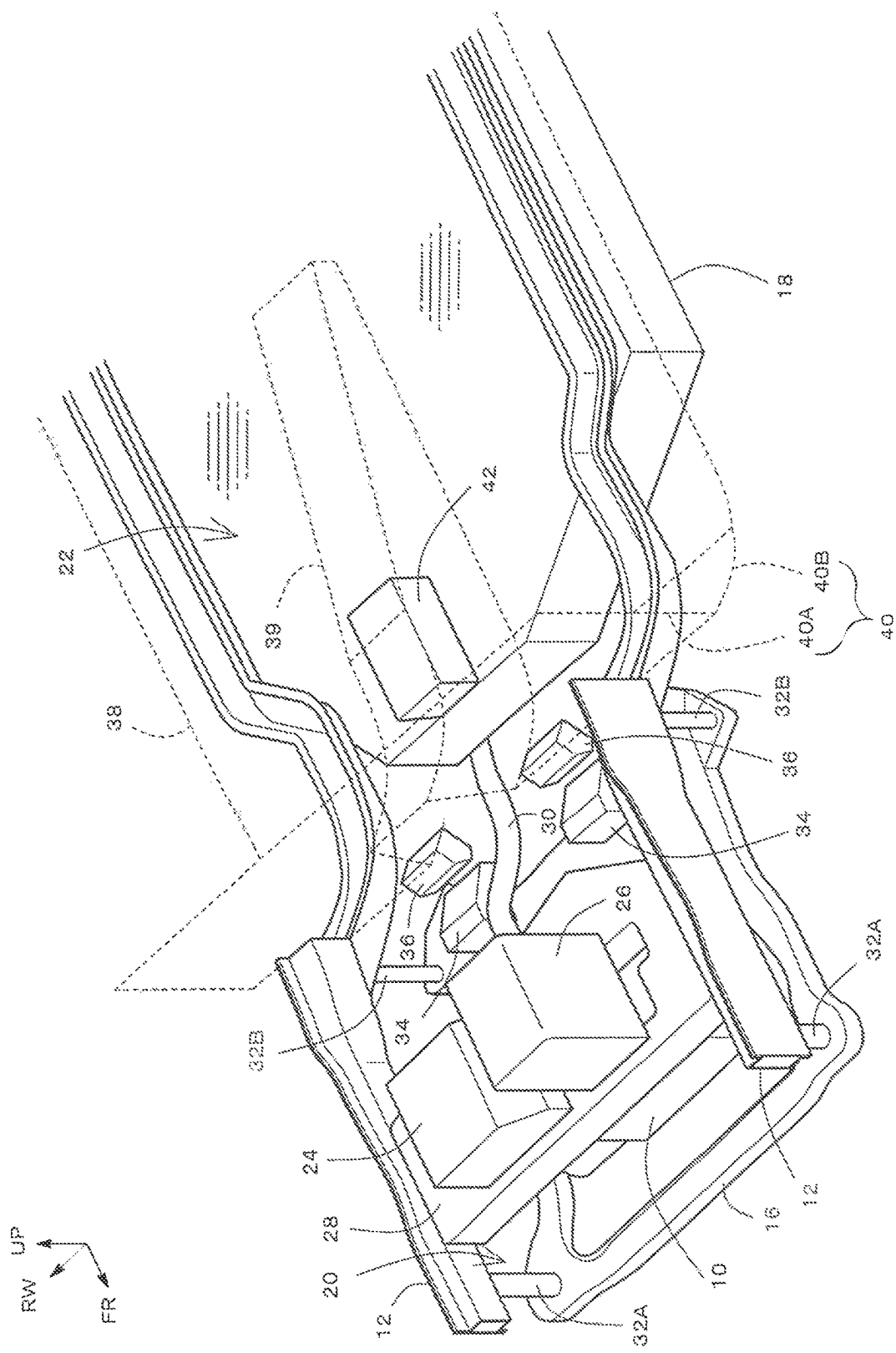
FIG. 1 is a perspective view illustrating a vehicle front-part structure according to the present embodiment.
Figure 2:
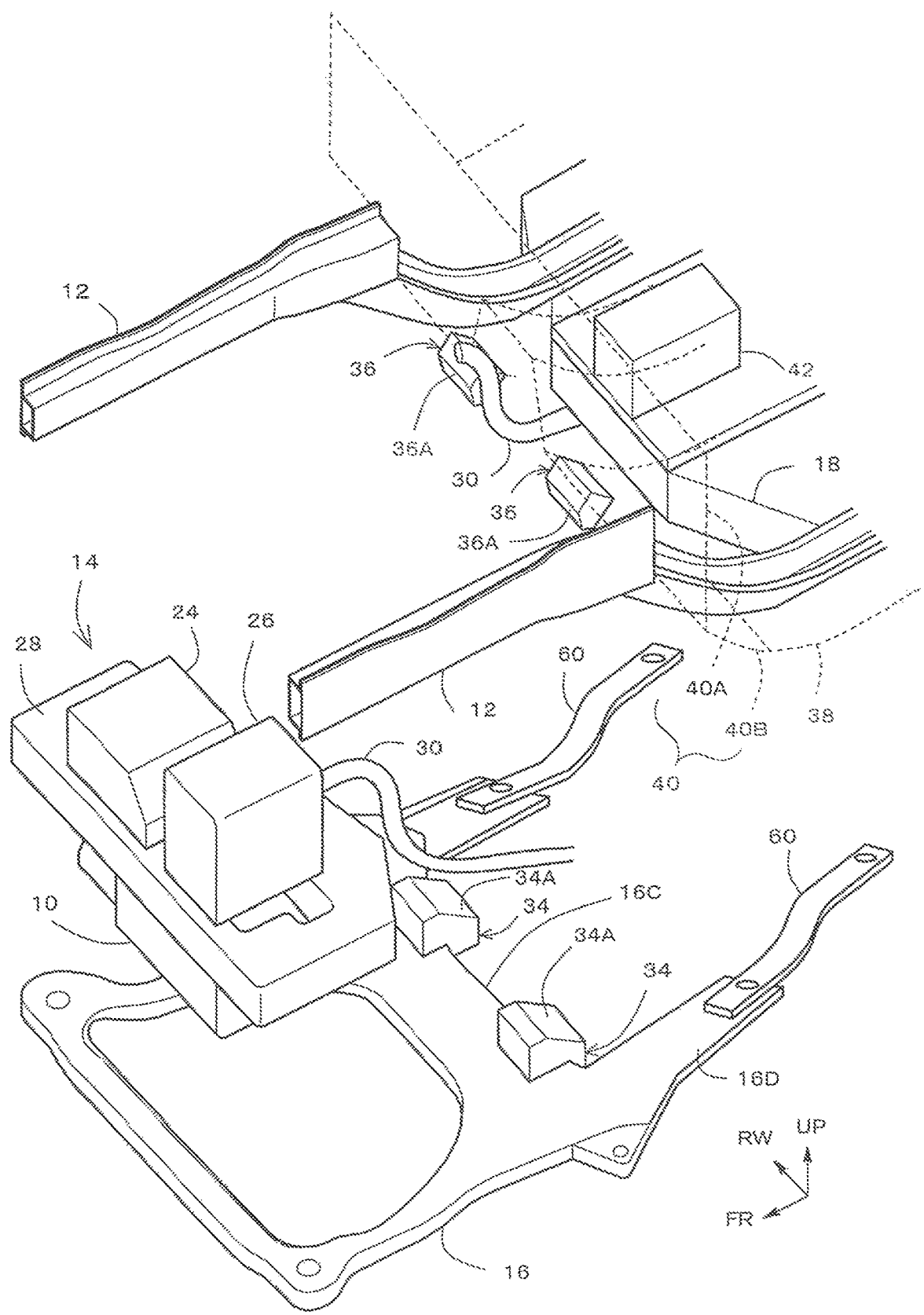
FIG. 2 is an exploded perspective view illustrating the vehicle front-part structure according to the present embodiment.

FIG. 1 illustrates a perspective view of a vehicle front-part structure according to the present embodiment, and FIG. 2 illustrates an exploded perspective view of the vehicle front-part structure.

In FIG. 1 to FIG. 10, the axis indicated by the sign FR represents the vehicle front-and-rear direction, and the axis indicated by the sign RW represents the width direction (vehicle width direction). The axis indicated by the sign UP represents the vertical direction. The sign FR is an abbreviation of "front," and regarding the front-and-rear direction axis FR, the vehicle front is assumed to be the positive direction. The sign RW is an abbreviation of "right width," and regarding the width direction axis RW, the right width direction is assumed to be the positive direction. In addition, regarding the height axis UP, the up direction is assumed to be the positive direction.

As shown in FIG. 1, these FR axis, RW axis, and UP axis are orthogonal to one another. Hereinafter, the vehicle front-part of the vehicle according to the present embodiment will be described using these three axes as a reference if necessary. For example, a "front end" means an end portion of any member which is located on the positive direction side of the FR axis, and a "rear end" means an end portion of any member which is located on the negative direction side of the FR axis. The "width inner side" means the relatively inner side in the vehicle width direction along the RW axis, and the "width outer side" means the relatively outer side in the vehicle width direction along the RW axis. In addition, unless otherwise specifically noted, the "width direction" means the vehicle width direction. Further, the "upper side" means the relatively positive direction side of the UP axis, and the "lower side" means the relatively negative direction side of the UP axis.

The vehicle front-part structure shown in FIG. 1 and FIG. 2 is installed in an electric car which uses a rotating electric machine 10 as a driving source. The vehicle front-part structure includes front side members 12, 12, a high voltage system assembly 14, a suspension member 16, and a battery unit 18.

The front side members 12, 12 are a pair of skeleton members arranged on respective sides in the vehicle width direction (right and left), and each member extends rearward from the front end of the vehicle. For example, the front side members 12, 12 extend from an engine compartment 20 on the vehicle front side to a front portion of a vehicle chamber 22 (cabin) behind the engine compartment 20.

The high voltage system assembly 14 and the suspension member 16 are mounted in the engine compartment 20. The high voltage system assembly 14 is an assembly in which a plurality of high voltage apparatuses are assembled together. The high voltage system assembly 14 is formed by assembling the rotating electric machine 10, a charger 24, and an electric power conversion unit 26 on a compartment cross member 28.

The rotating electric machine 10 is a driving source of the vehicle and is assembled on the lower side of the compartment cross member 28, for example. The rotating electric machine 10 is composed of a permanent magnet synchronous motor, for example.

The charger 24 and the electric power conversion unit 26 are assembled on the upper side of the compartment cross member 28. The charger 24 is connected to, for example, a charging connector (not shown) and can be charged from, for example, a charging station outside the vehicle.

The electric power conversion unit 26 is connected between the rotating electric machine 10 and the battery unit 18 and performs electric power conversion. The electric power conversion unit 26 is formed to include, for example, an inverter for performing AC/DC power conversion and a DC/DC converter for performing voltage step-up/step-down operation. The electric power conversion unit 26 houses the inverter and the DC/DC converter in a cuboid case, for example. Further, the rear surface of the case is connected to a high voltage cable 30 which is connected to the battery unit 18. The bottom surface of the case is also connected to a high voltage cable (not shown) which is connected to the rotating electric machine 10.

The compartment cross member 28 is a skeleton member fixed to the pair of right and left front side members 12, 12. The compartment cross member 28 is, for example, a frame member having a generally rectangular shape and has an opening formed in the center thereof so as to vertically penetrate through the compartment cross member 28. The high voltage cable (not shown) connecting the rotating electric machine 10 and the electric power conversion unit 26 is placed through this opening.

The rotating electric machine 10, the charger 24, and the electric power conversion unit 26 are assembled on the compartment cross member 28 to form the high voltage system assembly 14. In the assembling step of the vehicle, the high voltage system assembly 14 is lifted up from below. Then, after the vertical positions of the compartment cross member 28 and the front side members 12, 12 are aligned, the compartment cross member 28 is fastened to the front side members 12, 12 using brackets (not shown). As a result of such assembling, the electric power conversion unit 26 is positioned above the front side members 12, as illustrated in FIG. 1.

The suspension member 16 is positioned under the high voltage system assembly 14 including the electric power conversion unit 26. In addition, as shown in FIG. 1, the suspension member 16 is provided in front of the battery unit 18. Namely, the suspension member 16 is positioned so as to be aligned with the battery unit 18 in height (vertical direction).

The suspension member 16 is a skeleton member for suspending the front wheels (not shown). The suspension member 16 has the shape of approximately parallel crosses, and both width direction sides of the front end portion and both width direction sides of the rear end portion are shaped to project outside in the width direction. Supporting members 32A and 32B are fastened to both width direction sides of the front end portion and both width direction sides of the rear end portion, respectively. The supporting members 32A and 32B are also fastened to the bottom surfaces of the front side members 12, 12. Namely, the suspension member 16 is hung and supported by the front side members 12 via the supporting members 32A and 32B.

Figure 4:
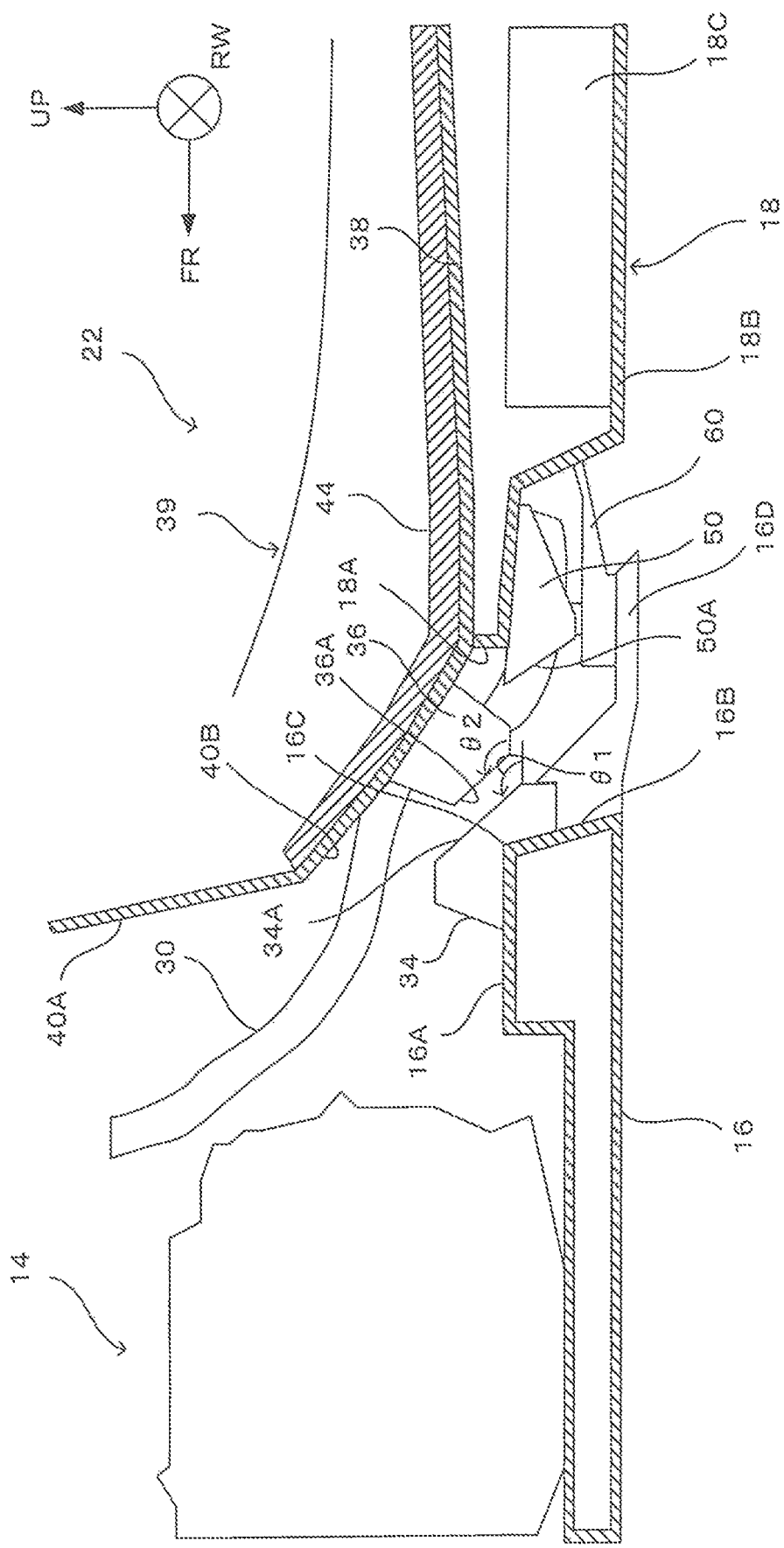
FIG. 4 is a cross-sectional side view taken along line A-A in FIG. 3.

Further, a pair of member-side extensions 34, 34 (member-side extension members) are provided on the rear end of the suspension member 16. As illustrated in FIG. 4, the member-side extension 34 is attached to extend from an upper surface rear end 16A to a rear surface upper end 16B of the suspension member 16, and is fastened so as to be hooked on the rear end of the suspension member 16.

For example, the member-side extension 34 is a generally box-shaped rigid member made of a metallic material such as aluminum, and an opening in the box-shaped member is covered with the upper surface rear end 16A and the rear surface upper end 16B of the suspension member 16 to form a closed cross-section structure.

The member-side extension 34 may be fastened to the suspension member 16 using a fastening member, such as nuts and bolts, or may be joined to the suspension member 16 by welding, for example. In addition, the member-side extension 34 may be formed as a portion of the suspension member 16 by processing the rear end of the suspension member 16 to protrude upward.

The member-side extension 34 protrudes upward from the upper surface of the suspension member 16. Further, as shown in FIG. 1, the member-side extensions 34, 34 are arranged at positions facing floor-side extensions 36, 36 in the vehicle front-and-rear direction on a rear end edge 16C of the suspension member 16. The suspension member 16 extends rearward from both sides in the vehicle width direction to form extension portions 16D. Accordingly, the rear end edge 16C of the suspension member 16, on which the member-side extensions 34, 34 are arranged, is located in front of the extension portions 16D of the rear edge ends on both sides in the vehicle width direction. Referring to FIG. 4, the rear end edge 16C of the suspension member 16 is a ridge which defines the border between the upper surface rear end 16A and the rear surface upper end 16B of the suspension member 16, and the member-side extensions 34, 34 are arranged on the ridge. Further, referring to FIG. 3, the member-side extensions 34, 34 are provided along the vehicle width direction with the high voltage cable 30 interposed therebetween.

Referring to FIG. 4, opposing surfaces 34A facing the floor-side extensions 36 in the vehicle front-and-rear direction are formed on the member-side extensions 34. The opposing surfaces 34A are inclined surfaces that are inclined downward toward the vehicle rear side. As described below, by adopting an inclined surface as the opposing surface 34A, it becomes possible to drop the suspension member 16 to the lower side of the vehicle at the time of a frontal collision.

In addition, according to this embodiment, an angle of inclination θ1 of the opposing surfaces 34A of the member-side extensions 34 with respect to the horizontal surface is formed to be smaller than an angle of inclination θ2 of the opposing surfaces 36A of the floor-side extensions 36 with respect to the horizontal surface (θ1>θ2). In other words, the opposing surfaces 34A of the member-side extensions 34 are inclined to be more horizontal than the opposing surfaces 36A of the floor-side extensions 36. It is not necessary to be θ1>θ2. It may be θ1=θ2 or θ1>θ2.

As such, by forming the opposing surfaces 34A of the member-side extensions 34 to be laid more horizontal than the opposing surfaces 36A of the floor-side extensions 36, the opposing surfaces 36A of the floor-side extensions 36 and the opposing surfaces 34A of the member-side extensions 34 are aligned in parallel in a side view when the rear end of the suspension member 16 is inclined downward and the opposing surfaces 34A of the member-side extensions 34 are directed downward at the time of a frontal collision as described below.

Referring to FIG. 1, the vehicle chamber 22 is partitioned by a floor panel 38 and a dash panel 40. The dash panel 40 includes a dash upper panel 40A which is an upper panel and a dash lower panel 40B which is a lower panel.

The dash upper panel 40A stands approximately vertically. The upper end of the dash lower panel 40B is connected to the lower end of the dash upper panel 40A and further extends therefrom in a curved form in a side view. The dash lower panel 40B is bent from a vertical form into an arc or inclined form, and its rear end then becomes approximately horizontal and is connected to the front end of the floor panel 38.

The dash lower panel 40B functions as a so-called toe board on which the feet of a passenger on the front seat rest. Because of such a function, the floor plate of the vehicle chamber 22 is composed of the dash lower panel 40B and the floor panel 38.

A floor tunnel 39 is formed in the center in the width direction of the dash lower panel 40B and the floor panel 38. If an internal combustion engine is installed in the vehicle, an exhaust pipe runs through this floor tunnel 39. Meanwhile, for an electric car in which no internal combustion engine is installed, the exhaust pipe is unnecessary, and therefore, for example, a battery ECU 42 for monitoring or controlling batteries is positioned in the floor tunnel 39.

Figure 3:
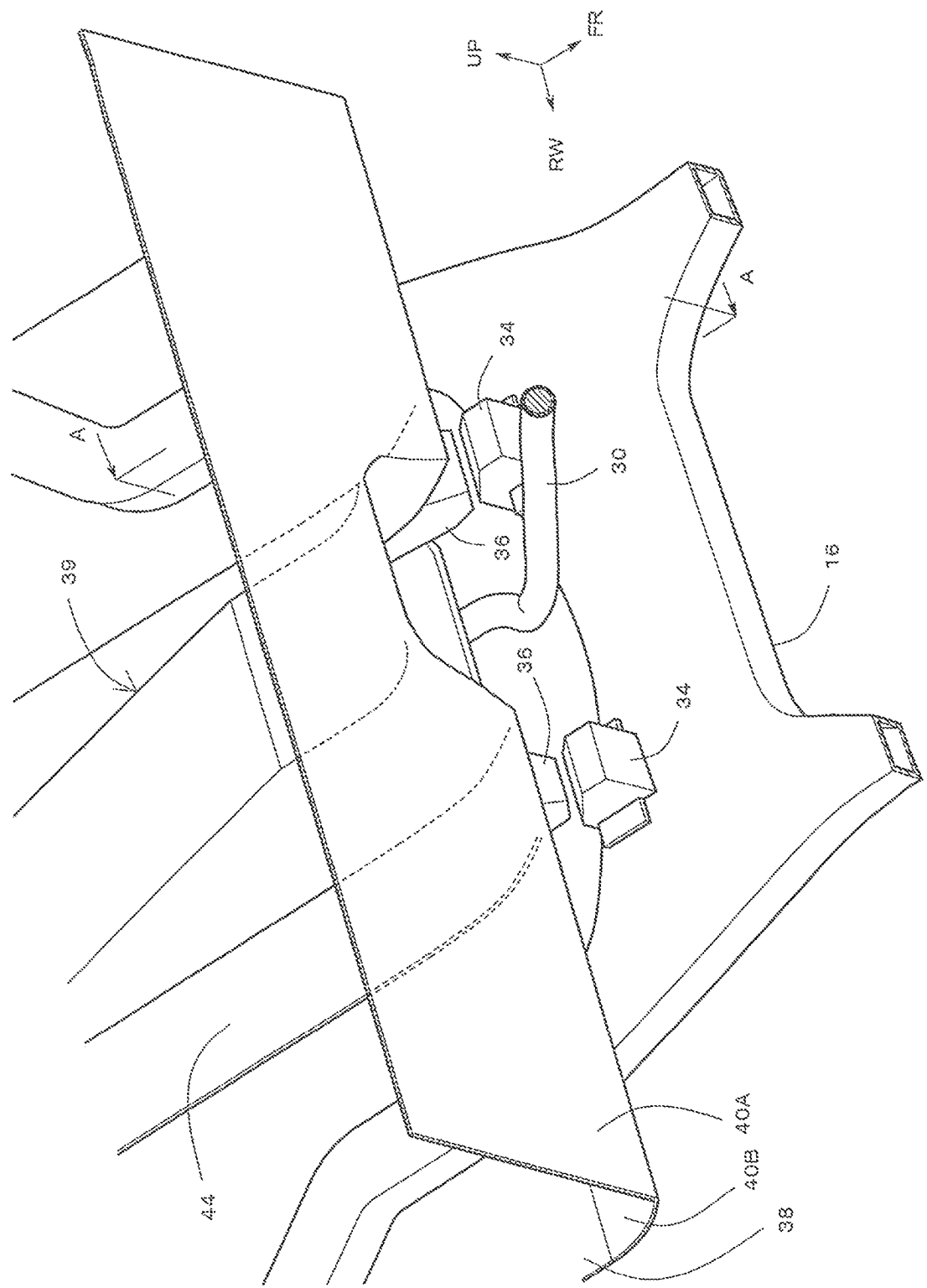
FIG. 3 is a perspective view illustrating a rear portion of the vehicle front-part structure according to the present embodiment.

Further, referring to FIG. 3, the floor tunnel 39 is reinforced by a reinforcing member called a tunnel reinforcer 44. The tunnel reinforcer 44 covers the floor tunnel 39 and extends in the width direction to the floor plate regions on both sides of the floor tunnel 39 (the upper surfaces of the dash lower panel 40B and the floor panel 38). As shown in FIG. 3, the floor-side extensions 36, 36 are arranged under these extending portions. Namely, the floor-side extensions 36, 36 are arranged under a portion of at least one of the dash lower panel 40B and the floor panel 38 constituting the floor plate, on which the reinforcing member (tunnel reinforcer 44) is provided.

Returning to FIG. 1, the battery unit 18 is positioned under the floor of the vehicle chamber, that is, under the floor panel 38. The battery unit 18 includes an enclosure case 18B and a battery assembly 18C located in the case 18B. The battery assembly 18C include a plurality of battery cells (single cells), and the battery cell is composed of a lithium-ion secondary battery, nickel-hydrogen secondary battery, or all-solid battery, for example. For example, a plurality of such battery cells are connected in parallel to form a battery group, and a plurality of battery groups are further connected in series to form the battery assembly 18C. In this example, the battery ECU 42 is also located in the case 18B (under the floor tunnel).

The high voltage cable 30 is connected to the width direction center of the lower front end portion of the battery unit 18 (see FIG. 4). The high voltage cable 30 extends upward and forward from the front surface 18A of the battery unit 18 and is connected to the electric power conversion unit 26 of the high voltage system assembly 14. For example, as illustrated in FIG. 1, the high voltage cable 30 is placed to extend diagonally upward and forward in a side view where the left side is assumed to be the vehicle front. The high voltage cable 30 supplies electric power from the battery assembly 18C to the rotating electric machine 10.

The floor-side extensions 36, 36 (floor-side extension members) are provided on the lower surface of the dash lower panel 40B, which is a portion of the floor plate constituting the floor of the vehicle chamber 22. The floor-side extensions 36, 36 are provided in front of the front surface 18A of the battery unit 18. For example, as shown in FIG. 4, the floor-side extensions 36 are attached on the lower surface of the dash lower panel 40B such that at least the opposing surfaces 36A facing the member-side extensions 34 are in front of the front surface 18A of the battery unit 18.

Although, in the example in FIG. 1, the floor-side extensions 36, 36 are provided on the lower surface of the dash lower panel 40B, the present embodiment is not limited to this form. In short, the floor-side extensions 36, 36 only need to be provided on the lower surface of the floor of the vehicle chamber 22 so as to be in front of the front surface 18A of the battery unit 18. Specifically, the floor-side extensions 36, 36 only need to be provided on the lower surface of at least one of the dash lower panel 40B and the floor panel 38 constituting the floor of the vehicle chamber 22 so as to be in front of the front surface 18A of the battery unit 18. For example, the floor-side extensions 36, 36 may be provided on the lower surface of the floor panel 38 or may be provided across the lower surfaces of both the dash lower panel 40B and the floor panel 38.

The floor-side extensions 36 protrude downward from the lower surface of the dash lower panel 40B such that the opposing surfaces 36A face the opposing surfaces 34A of the member-side extensions 34 in the vehicle front-and-rear direction. For example, the floor-side extensions 36, 36 are generally box-shaped rigid members made of a metallic material such as aluminum, and an opening in the box-shaped member is covered with the dash lower panel 40B to form a closed cross-section structure.

Referring FIG. 4, the opposing surfaces 36A of the floor-side extensions 36 are inclined surfaces that are inclined downward toward the vehicle rear side. As described below, these inclined surfaces function as sliding surfaces for dropping the suspension member 16 to the lower side at the time of a frontal collision. An angle of inclination θ2 of the opposing surfaces 36A with respect to the horizontal surface is determined in accordance with a desired amount for dropping the suspension member 16.

In addition, the angle of inclination θ2 of the opposing surfaces 36A of the floor-side extensions 36 with respect to the horizontal surface may be formed to be greater than the angle of inclination θ1 of the opposing surfaces 34A of the member-side extensions 34 with respect to the horizontal surface.

Referring to FIG. 3, the floor-side extensions 36, 36 are provided on the lower surface of the dash lower panel 40B along the vehicle width direction with the high voltage cable 30 interposed therebetween. For example, the floor-side extensions 36, 36 are provided at the border portion with the floor tunnel 39 on the floor surface of the vehicle chamber 22.

<Structure of Battery-Side Extensions>

Referring to FIG. 4, battery-side extensions 50, 50 (battery-side extension members, only one of which is shown in the figure) are mounted on the lower surface of the front part of the case 18B of the battery unit 18 which is on the diagonally lower rear side of the floor-side extensions 36, 36. The front end of this battery-side extension 50 is positioned in front of the front surface of the battery unit 18. The battery-side extension 50 has, on its front side, an inclined surface 50A corresponding to the opposing surface 34A of the member-side extension 34. If the member-side extension 34 proceeds rearward, slides downward and rearward on the opposing surface 36A of the floor-side extension 36, and further moves rearward, the battery-side extension 50 faces the member-side extension 34 to guide it further downward and rearward. It is thus possible to prevent the suspension member 16 and the components associated with it from colliding with the battery unit 18 and destroying the battery assembly 18C and the like. At this time, the battery-side extension 50 moves to the upper rear side.

The function of the battery-side extension 50 is very similar to that of the floor-side extension 36, and they can thus be formed in a similar shape and made of similar materials. Although the collision of the member-side extension 34 with the floor-side extension 36 causes the floor-side extension 36 to move upward, and thus the battery-side extension 50 is also lifted upward, the member-side extension 34 moves downward. The angle of the inclined surface 50A may therefore be almost the same as θ2. Because deformation varies depending on the structure of, for example, the dash lower panel 40B, an optimal shape may be adopted, as appropriate. In addition, because a portion on which the battery-side extension 50 is to be mounted has ample room rearward, the battery-side extension 50 may have a longer length on the rear side, compared to the floor-side extension 36.

Figure 8:
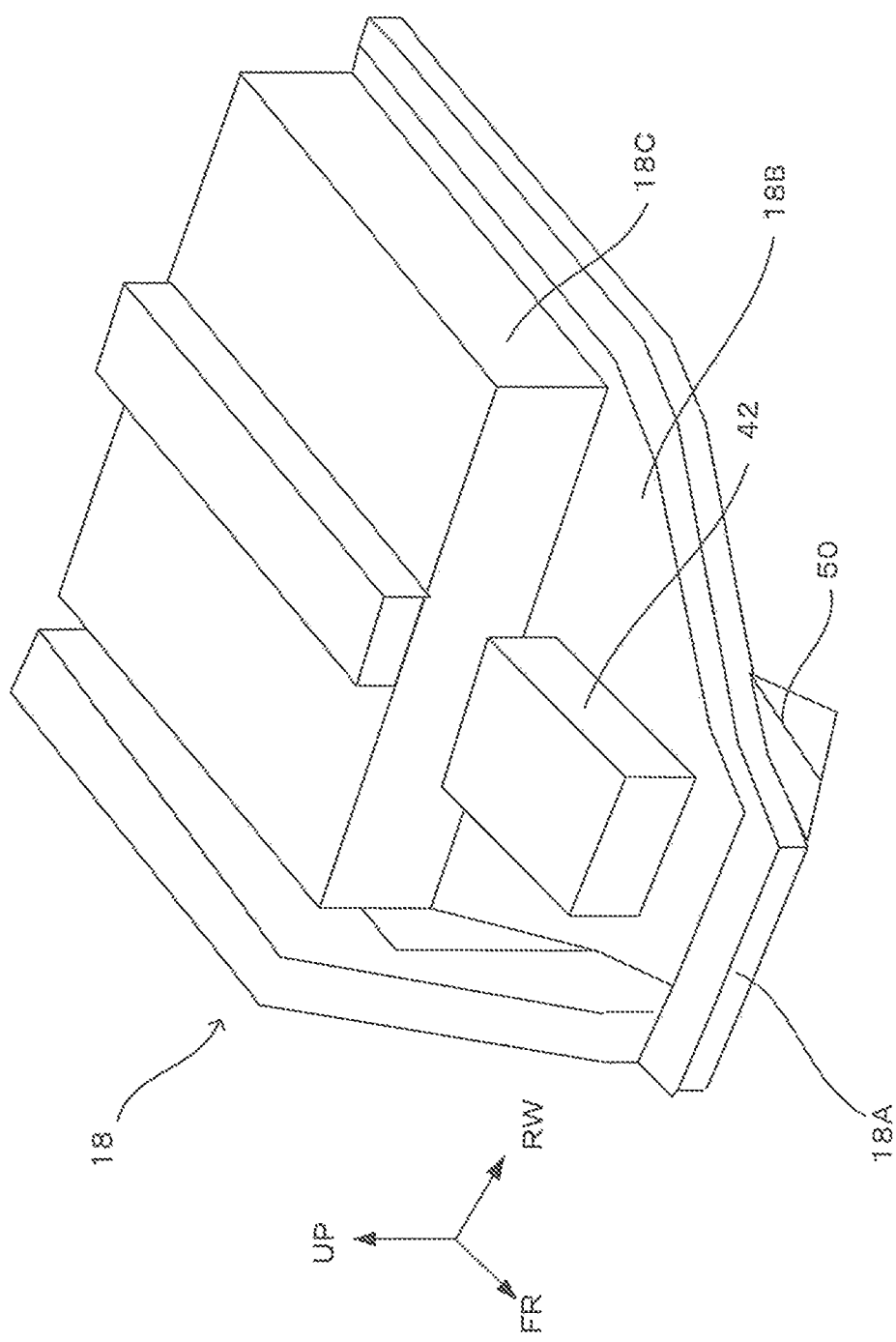
FIG. 8 is a diagram showing a battery unit with its upper side opened.

Referring now to FIG. 8, this drawing shows the battery unit 18 with its upper side opened. As shown in this figure, in the case 18B, the battery ECU 42 is located on the front side, and the battery assembly 18C is located on the rear side. In addition, the battery-side extensions 50 are mounted on both sides of the lower surface of the case 18B. It is also possible to locate the battery-side extension 50 on one side of the lower surface of the case 18B, rather than both sides of the lower surface. A portion of the floor of the case 18B on which the battery-side extensions 50 are mounted does not include any components, and this portion is hollow. That is, components, such as the battery ECU 42, are located at positions shifted from that portion in the vehicle width direction. Therefore, it is possible to reduce an impact on the components even when the member-side extensions 34 collide with the battery-side extensions 50, and the battery-side extensions 50 move upward. The case 18B is usually like an enclosure, and its upper side is closed.

<Structure of Brackets>

Referring to FIG. 2, elongated plate-shaped extension portions 16D are formed on the rear ends on both sides in the vehicle width direction of the suspension member 16 so as to extend rearward. An end of a bracket 60 is fastened to this extension portion 16D.

Figure 9:
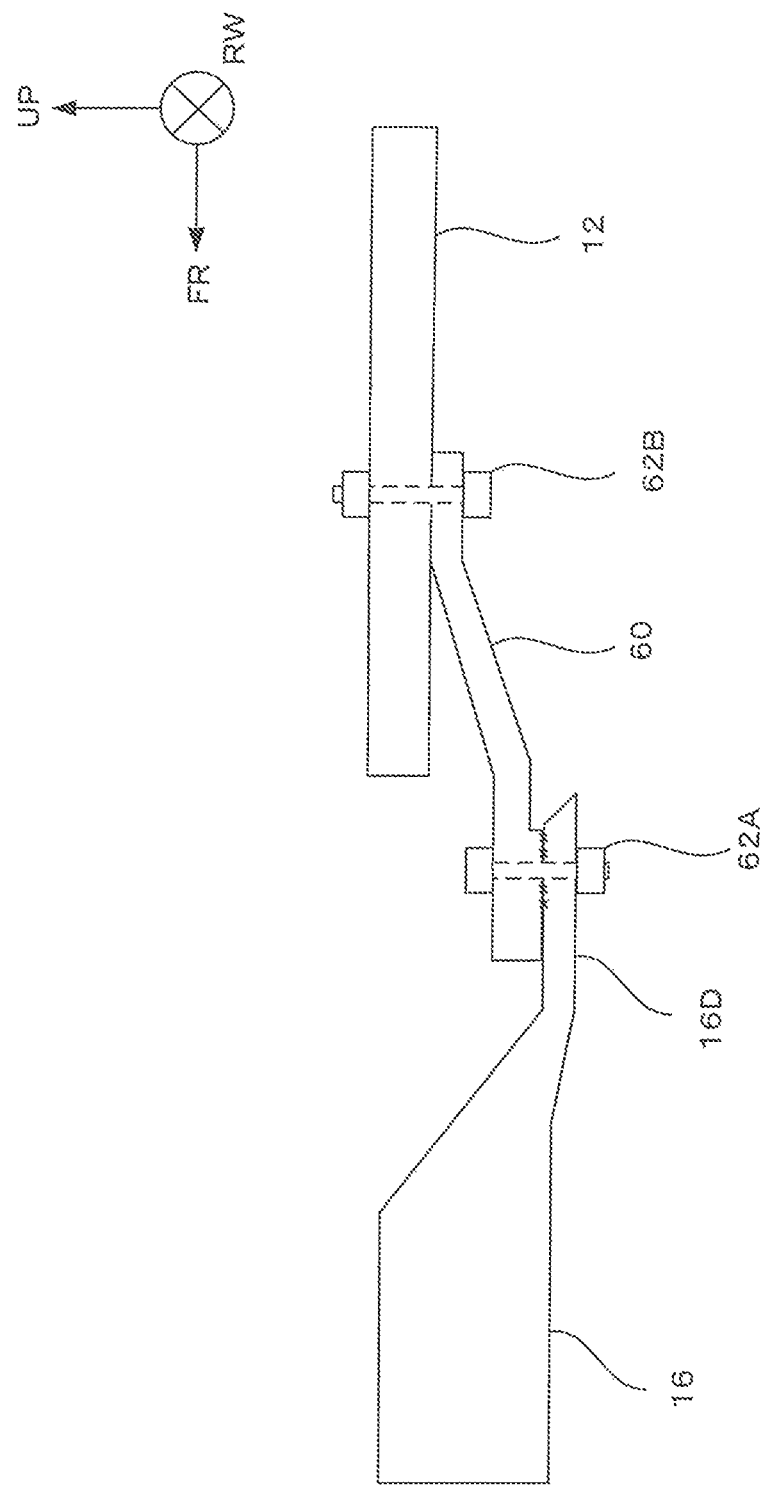
FIG. 9 is a diagram showing a connection between the suspension member and the body side using a bracket.

FIG. 9 shows the bracket 60 in the fastened state. As shown in this figure, the front end of the bracket 60 is welded and then bolted by a fastening member 62A, such as nuts and bolts, to the extension portion 16D of the suspension member 16, and the rear end is bolted by a fastening member 62B, such as nuts and bolts, to, for example, the lower surface of the front side member 12 on the body side. Thus, this bracket 60 can also prevent the suspension member 16 from moving toward the battery unit 18. The rear end of the bracket 60 may be fastened to other members rather than the side member, as long as it is a high-strength member on the body side.

In this respect, a platform, such as a chassis, is sometimes shared between a high body car and a low body car. In such a case, a height difference between the body side and the suspension member 16 varies. The bracket 60 is for connecting between the suspension member 16 and the body side, and the shape of this bracket 60 can be changed to make an adjustment to share the platform between the high body car and the low body car.

<Behavior at Time of Frontal Collision>

Figure 5:
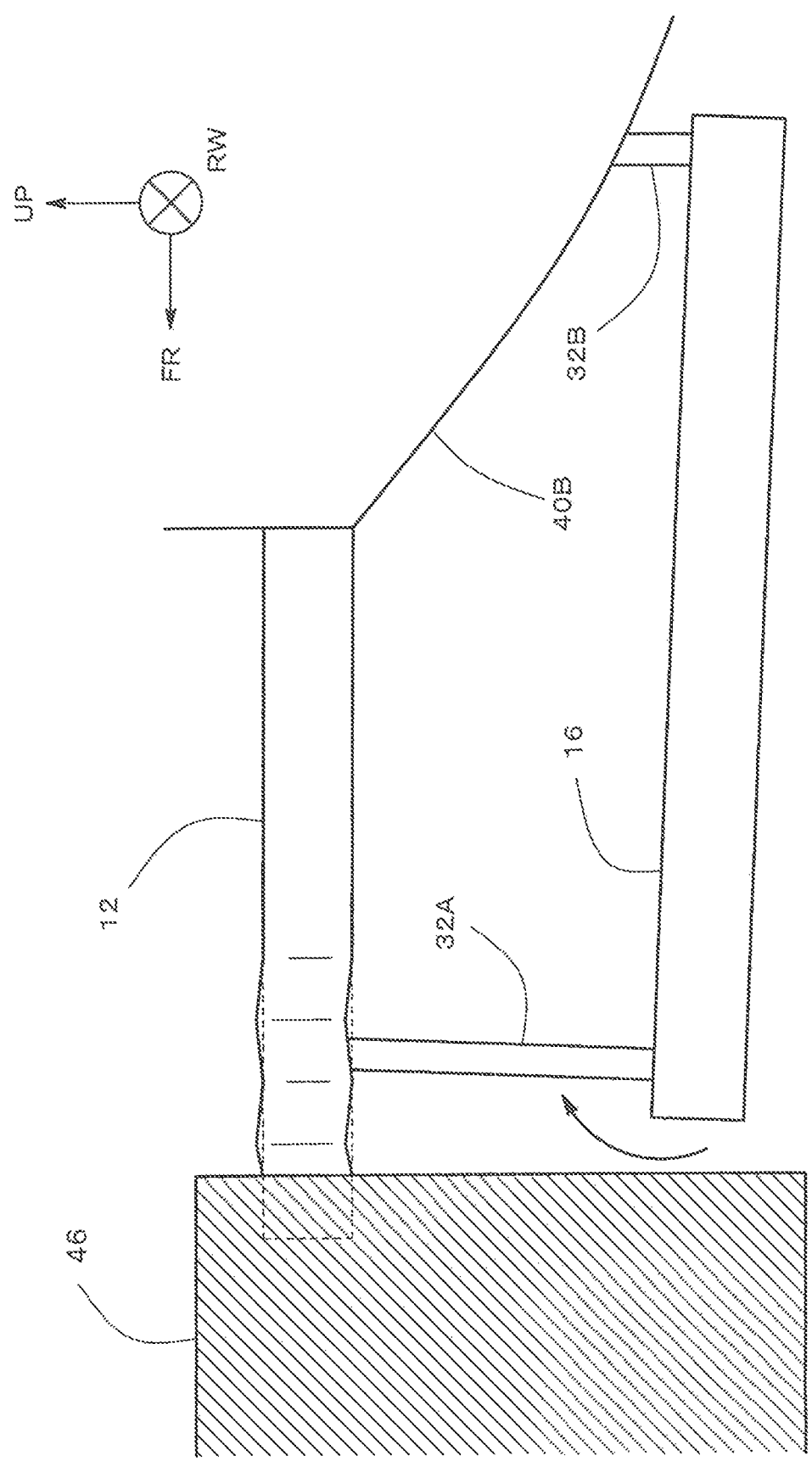
FIG. 5 is a side view explaining behaviors of a suspension member at the time of a frontal collision.
Figure 6:
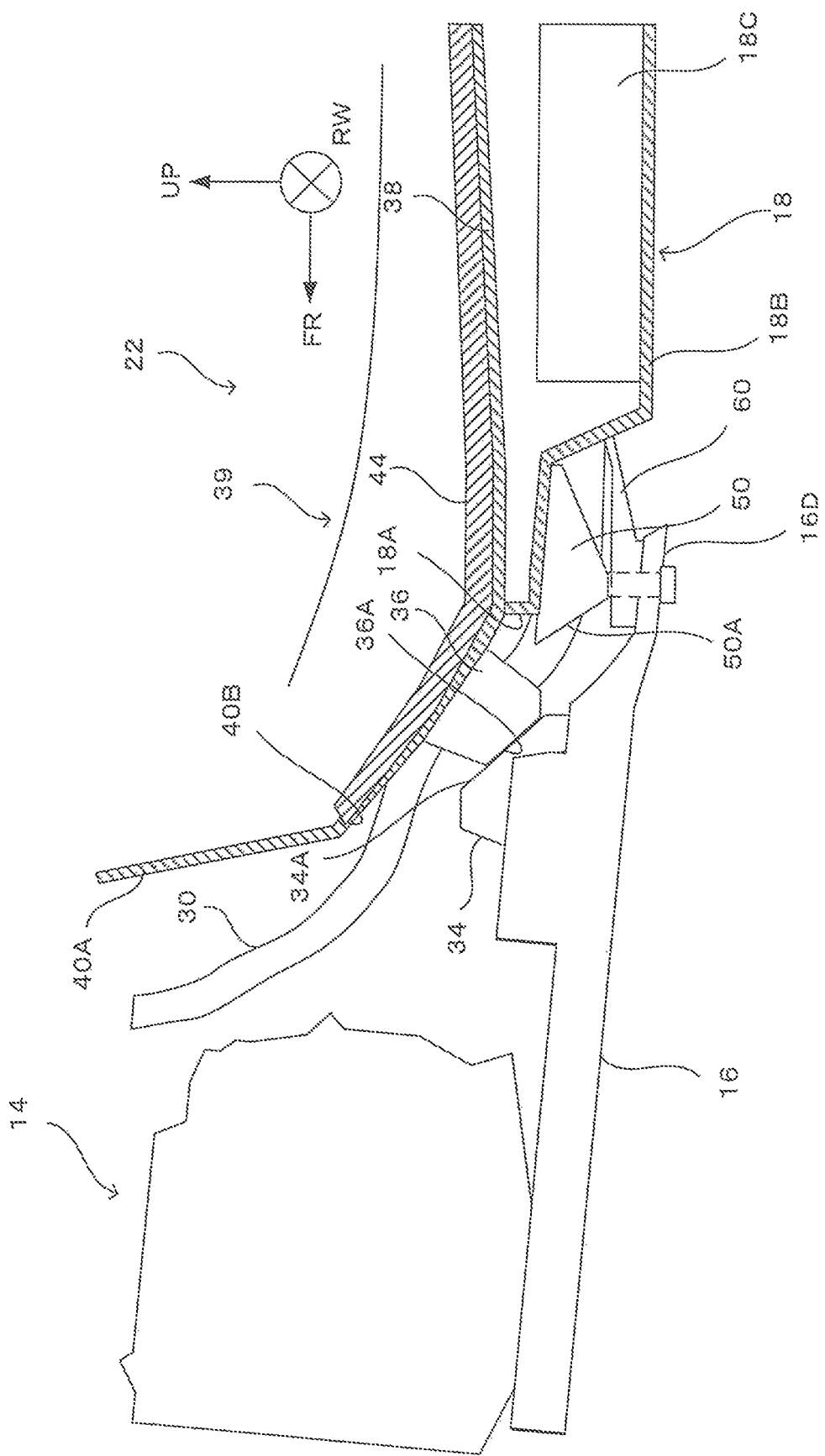
FIG. 6 is a side view (1/2) explaining a state around a member-side extension, a floor-side extension and a battery-side extension at the time of a frontal collision.

Behaviors of the vehicle front-part structure according to the present embodiment at the time of a frontal collision will be described with reference to FIG. 4 to FIG. 7. As illustrated in FIG. 5, when the vehicle front surface collides with an obstacle 46 (barrier), the front end of the front side member 12 receives the obstacle and is bent and deformed (buckled). As a result of this bending deformation, the supporting member 32A supporting the suspension member 16 on the front side member 12 is retracted. As a result, the front end of the suspension member 16 is lifted upward, and the rear end is inclined downward.

Figure 7:
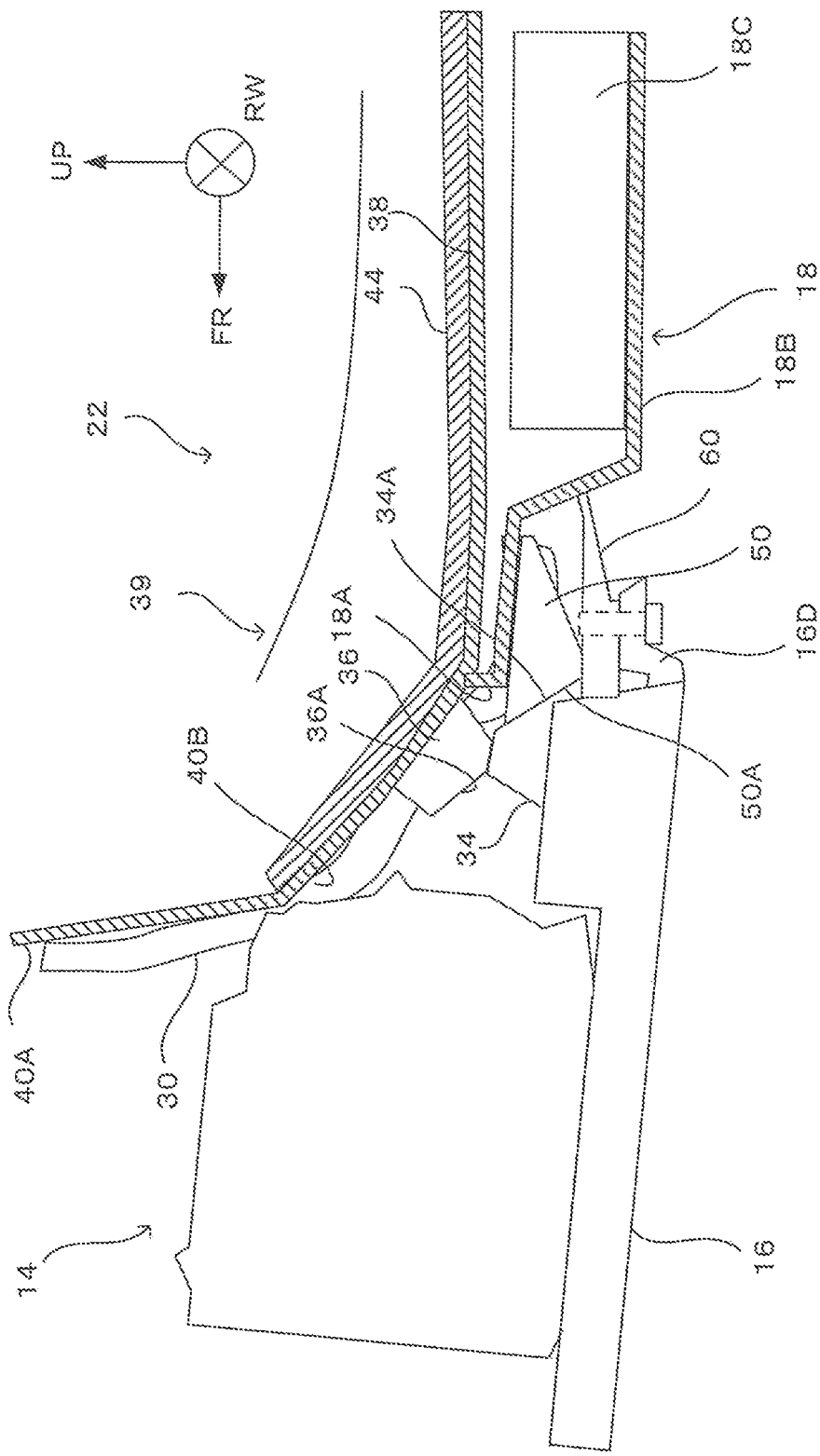
FIG. 7 is a side view (2/2) explaining a state around the member-side extension, the floor-side extension and the battery-side extension at the time of the frontal collision.

As the rear end of the suspension member 16 is inclined, the opposing surfaces 34A of the member-side extensions 34 are directed downward, and the opposing surfaces 34A and the opposing surfaces 36A of the floor-side extensions 36 become parallel to each other in a side view. The suspension member 16 is further retracted while keeping this parallel state, and as illustrated in FIG. 7, the opposing surfaces 34A of the member-side extensions 34 collide with the opposing surfaces 36A of the floor-side extensions 36. In addition, it is not necessary that the rear end of the suspension member 16 inclines downwardly. Because, the same behavior occurs if the suspension member 16 moves backward and the opposing surface 34A of the member-side extension 34 collides with the opposing surface 36A of the floor-side extension 36.

At the time of this collision, the load which is large enough to sink the floor-side extensions 36 into the vehicle chamber is input to the floor-side extensions 36 which received the collision of the member-side extensions 34. Here, as described above, the floor-side extensions 36 are provided under the tunnel reinforcer 44, which is a reinforcing member. In other words, the floor-side extensions 36 are lined up with the tunnel reinforcer 44. Therefore, the tunnel reinforcer 44 receives the load of the floor-side extensions 36 applied to the inside of the vehicle chamber 22, thereby preventing the floor-side extensions 36 from entering the vehicle chamber 22.

As the frontal collision further progresses, the opposing surfaces 34A of the member-side extensions 34 and the opposing surfaces 36A of the floor-side extensions 36, which are inclined surfaces, guide the suspension member 16 downward. Namely, the member-side extensions 34 slip downward and rearward with respect to the floor-side extensions 36, which causes the suspension member 16 to drop downward and rearward. Thus, it becomes possible to avoid the suspension member 16 entering the vehicle chamber 22.

When the suspension member 16 further moves downward and rearward, as illustrated in FIG. 7, the opposing surfaces 34A of the member-side extensions 34 collide with the inclined surfaces 50A of the battery-side extensions 50. The inclined surface 50A of the battery-side extension 50 has an inclination approximately corresponding to the opposing surface 34 of the member-side extension 34 that progressed. The inclined surface 50A guides the member-side extension 34 downward and rearward to thereby allow the suspension member 16 to progress further downward and rearward. At this time, although the extension portions 16D of the suspension member 16 are largely deformed, the suspension member 16 moves further downward and rearward, and it thus becomes possible to avoid a collision of the suspension member 16 with the battery unit 18 and high voltage cable 30.

As such, by providing the battery-side extensions 50 on the lower surface of the front part of the case 18B of the battery unit 18, which is on the lower rear side of the floor-side extensions 36, the member-side extensions 34 can collide with the floor-side extensions 36 and then the battery-side extensions 50 sequentially, and guide the suspension member 16 downward and rearward, thereby avoiding the suspension member 16 entering the vehicle chamber and colliding with the battery unit 18 and high voltage cable 30.

<Another Aspect of Present Embodiment>

Although, in the above embodiment, both the floor-side extensions 36 and the battery side extensions 50 are provided, the floor-side extensions 36 may be omitted.

Figure 10:
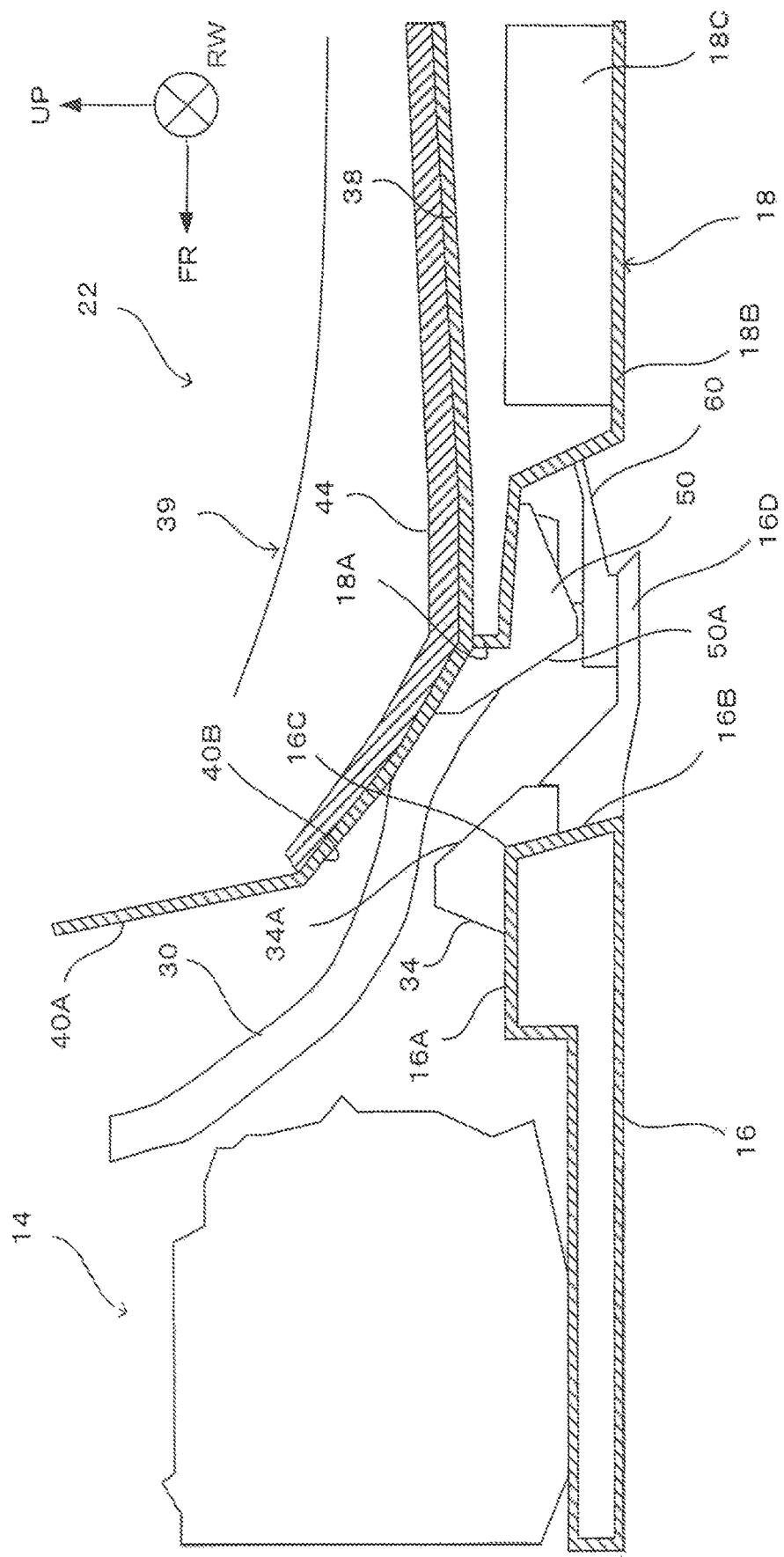
FIG. 10 is a side view illustrating a vehicle front-part structure according to another aspect of the present embodiment.

That is, as shown in FIG. 10, the inclined surface 50A of the battery-side extension 50 is located to face the opposing surface 34A of the member-side extension 34. When the suspension member 16 moves rearward due to a frontal collision, this arrangement allows the opposing surfaces 34A of the member-side extensions 34 to be guided downward and rearward by the inclined surfaces 50A of the battery-side extensions 50, thereby avoiding the suspension member 16 entering the vehicle chamber and colliding with the battery unit 18.

The invention claimed is:

1. A vehicle front-part structure comprising:
   a battery unit provided under a floor of a vehicle chamber; and
   a suspension member provided in front of the battery unit, wherein
   a floor-side extension member having a front end inclined surface is provided on a lower surface of the floor and in front of the battery unit, such that a lower side of the front end inclined surface is located on the rear side,
   a battery-side extension member having a front end inclined surface is provided on a front part of the battery unit which is on a lower rear side of the floor-side extension member, such that the lower side of the front end inclined surface is located on a rear side, and a member-side extension member having a rear end inclined surface is provided, on a rear end edge of the suspension member, at a position facing the floor-side extension member in a vehicle front-and-rear direction, such that a lower side of the rear end inclined surface is located on a rear side.

2. The vehicle front-part structure according to claim 1, wherein a lower end of the floor-side extension member is located lower than an upper end of the battery-side extension member.

3. The vehicle front-part structure according to claim 1, wherein an inclination of the rear end inclined surface of the member-side extension member is more horizontal than an inclination of the front end inclined surface of the floor-side extension member.

4. The vehicle front-part structure according to claim 1, wherein
the battery unit includes a battery assembly including a plurality of batteries, and a case for containing the battery assembly, and
the battery-side extension member is provided on a lower surface of a front part of the case, and in the case, a portion adjacent to the battery-side extension member is hollow.

5. A vehicle front-part structure comprising:
a battery unit provided under a floor of a vehicle chamber; and
a suspension member provided in front of the battery unit, wherein
a battery-side extension member having a front end inclined surface is provided on a front part of the battery unit such that a lower side of the front end inclined surface is located on a rear side, and
a member-side extension member having a rear end inclined surface is provided on a rear part of the suspension member which is in front of the battery-side extension member, such that a lower side of the rear end inclined surface is located on a rear side,
wherein the battery unit includes a battery assembly including a plurality of batteries and a case for containing the battery assembly, and
wherein the battery-side extension member is provided on a lower surface of a front part of the case, and in the case, a portion adjacent to the battery-side extension member is hollow.

* * * * *